UNITED STATES PATENT OFFICE.

JOSEPH KOETSCHET, OF LYON, AND MAX THEUMANN, OF ST. FONS, FRANCE, ASSIGNORS TO SOCIETE CHIMIQUE DES USINES DU RHONE, OF PARIS, FRANCE.

PROCESS OF MAKING NITRO-ACETIC ESTERS OF CELLULOSE.

1,286,025.   Specification of Letters Patent.   Patented Nov. 26, 1918.

No Drawing.   Application filed June 2, 1915.   Serial No. 31,707.

*To all whom it may concern:*

Be it known that we, JOSEPH KOETSCHET, of 24 Quai Claude Bernard, Lyon, France, a citizen of the Swiss Republic, and MAX THEUMANN, of St. Fons, Rhone, France, a citizen of the French Republic, have invented certain new and useful Processes of Making Nitro-Acetic Esters of Cellulose, of which the following is a specification.

The present invention has reference to the manufacture of nitro-acetic esters of cellulose, and it represents a modification of the invention described in the specification of the application for patent of Joseph Koetschet, Serial No. 845856, filed 18th June, 1914.

The invention described in the said prior specification comprises the subjecting of cellulose to a preliminary treatment in which small quantities of acetic anhydrid are employed in the presence of a condensing agent diluted with glacial acetic acid, the proportion of acetic anhydrid in the liquid mixture being about 1 to 20 per cent.; and also comprises the employment for acetylation of cellulose products which have been subjected to such a preliminary treatment.

The present invention is characterized in that nitric acid is used in the preliminary treatment described in the said previous specification, which can otherwise remain the same. On the subsequent acetylation, which can be carried out as described in the said previous specification, nitrogen-containing acetates are obtained.

*Example.*

10 parts of cellulose are treated with 60 parts of glacial acetic acid, 4 parts of acetic anhydrid, 0.5 part of 100% sulfuric acid, and 0.5 part of pure nitric acid.

The cellulose is rapidly attacked, loses its texture, and gives an easily fluid mass with the acid mixture.

The temperature is maintained at about 30° C. for several hours, and finally 21 parts of acetic anhydrid are added.

The acetylation takes place very quickly, the modified cellulose dissolves rapidly in the acetylating mixture, and gives a clear solution of great viscosity.

The ester may be precipitated direct from the solution by adding water, or it may be saponified partially in the solution and afterward precipitated, as indicated in the said previous specification.

By increasing or diminishing the quantity of nitric acid, different esters may be obtained containing more or less combined nitrogen.

What we claim and desire to secure by Letters Patent is:

1. In a process for the manufacture of nitro-acetic ester of cellulose, subjecting the cellulose to a preliminary treatment with glacial acetic acid together with about 1 to 20 per cent. of acetic anhydrid in the presence of a condensing agent and nitric acid.

2. In a process for the manufacture of nitro-acetic ester of cellulose, subjecting the cellulose to a preliminary treatment with glacial acetic acid together with about 1 to 20 per cent. of acetic anhydrid in the presence of sulfuric acid and nitric acid.

3. Process for the production of nitro-acetic ester of cellulose, comprising subjecting the cellulose to a preliminary treatment with glacial acetic acid together with about 1 to 20 per cent. of acetic anhydrid in the presence of nitric acid and a condensing agent, and acetylating the resulting conversion product.

4. Process for the production of nitro-acetic ester of cellulose, comprising subjecting the cellulose to a preliminary treatment with glacial acetic acid together with about 1 to 20 per cent. of acetic anhydrid in the presence of nitric acid and a condensing agent, and acetylating the resulting conversion product and precipitating the acetylated product.

5. Process for the production of nitro-acetic ester of cellulose, comprising subjecting the cellulose to a preliminary treatment with glacial acetic acid together with about 1 to 20 per cent. of acetic anhydrid in the presence of nitric acid and a condensing agent and acetylating the resulting conversion product, and partially saponifying and precipitating the acetylated product.

In testimony whereof we have signed our names to this specification in the presence of two subscribing witnesses.

JOSEPH KOETSCHET.
MAX THEUMANN.

Witnesses:
 JOHN J. ERNSTER,
 BENOITE MERMOY.